May 29, 1928.  1,671,682
A. E. NORRIS
VEHICLE CONSTRUCTION
Filed Dec. 15, 1923  2 Sheets-Sheet 1
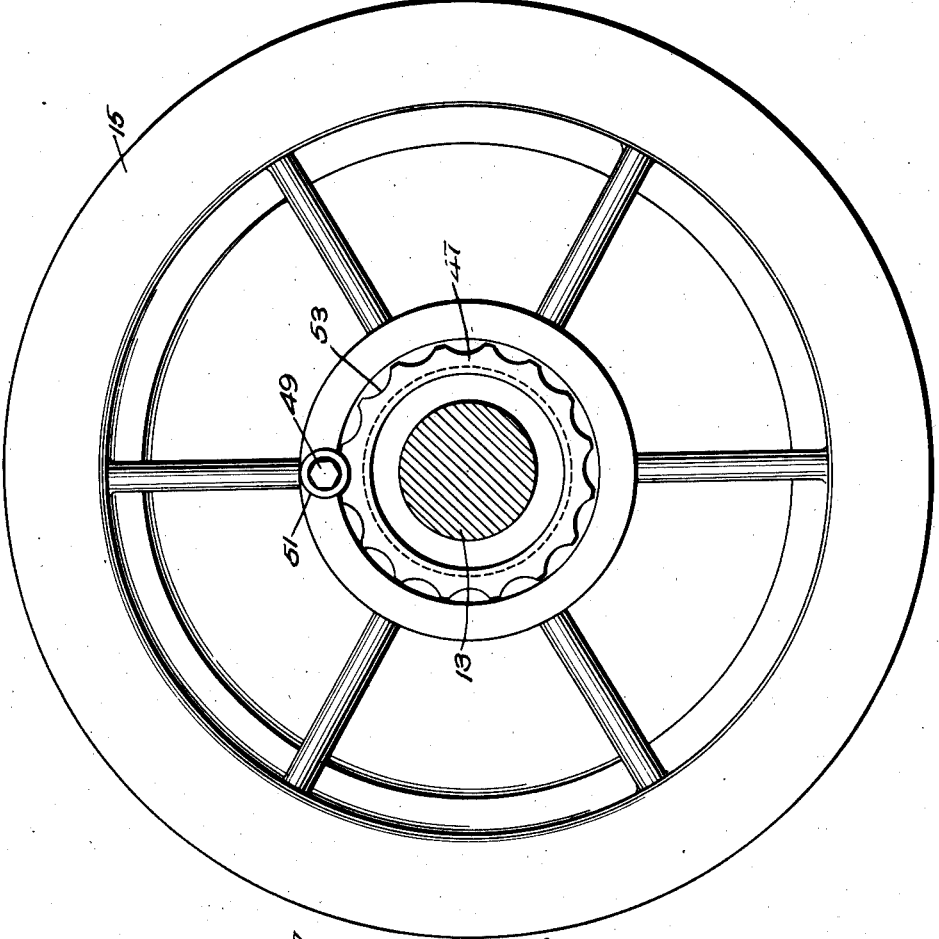
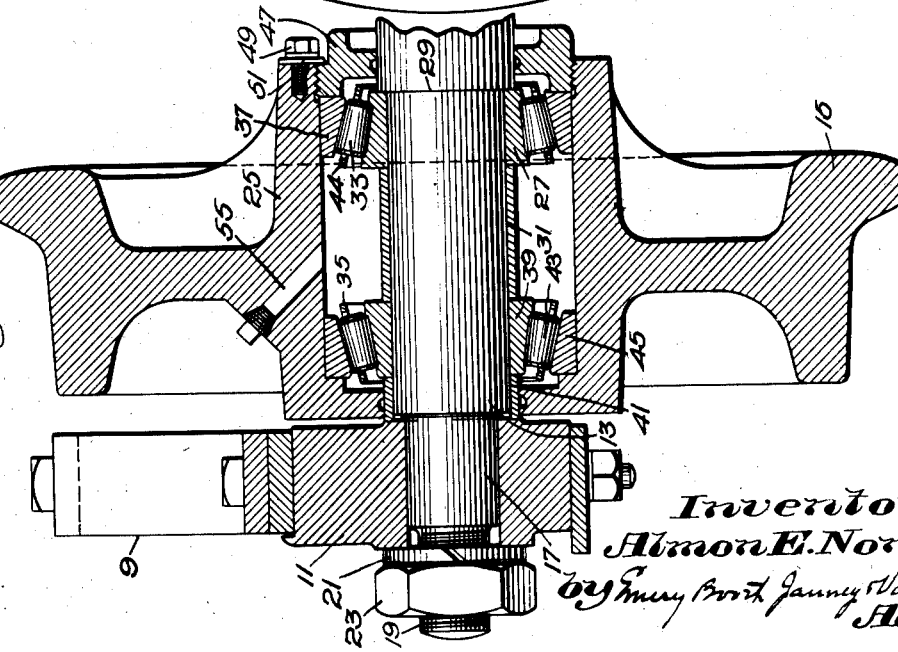
Inventor:
Almon E. Norris

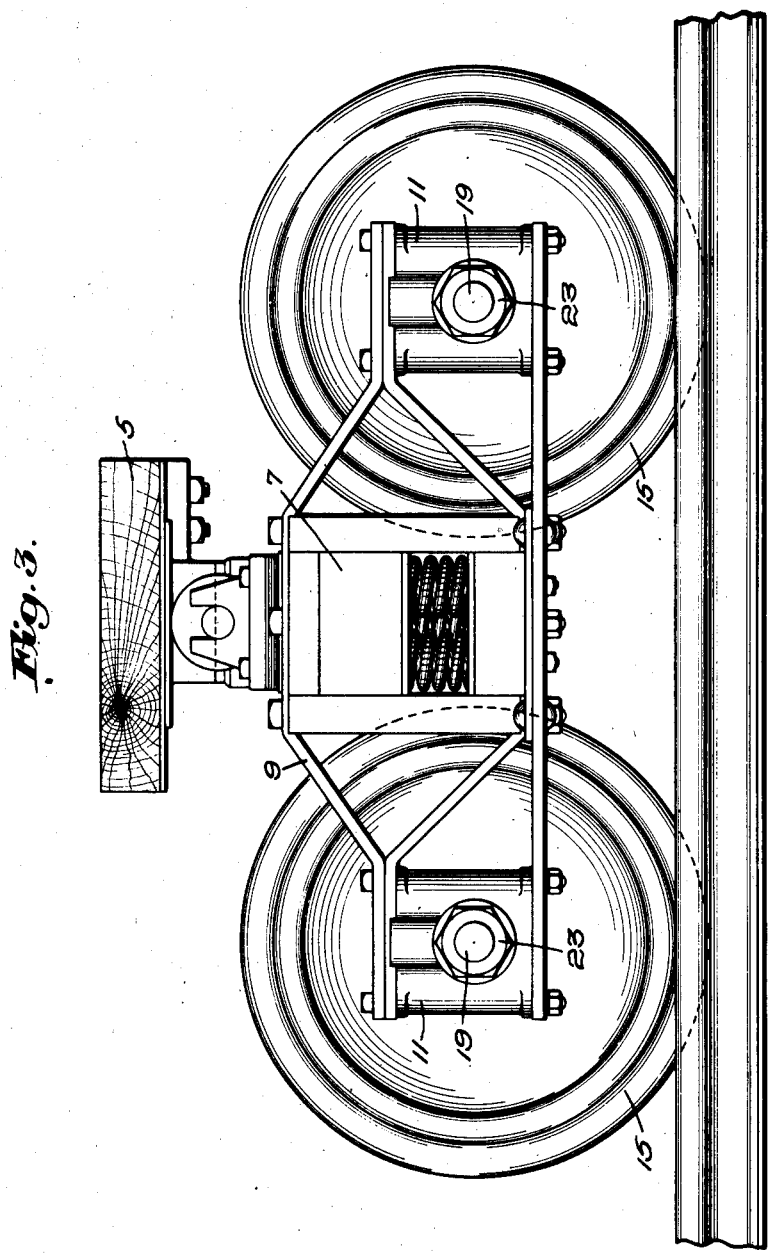

Patented May 29, 1928.

1,671,682

UNITED STATES PATENT OFFICE.

ALMON E. NORRIS, OF BROOKLINE, MASSACHUSETTS.

VEHICLE CONSTRUCTION.

Application filed December 15, 1923. Serial No. 680,957.

This invention relates to vehicle construction and consists more particularly in improvements in the axle and the wheel contruction of cable or other load-carrying ars.

For illustrative purposes the invention is erein shown as embodied in a car intended or use as a load-carrying cable car wherein he frame is provided with an axle, the ends f which are utilized to secure opposite side rame members in rigid relation, wheels beng provided to turn on the axle, one at each nd thereof and located between said side rame members. The invention, however, nay be usefully employed in other connecions than load-carrying cable cars. The described embodiment of the invention permits he use of tapered roller bearings for a wheel which is located between the side frame members in conjunction with means for adjusting the bearings, the bearing adjusting devices being operable independently of the devices employed for clamping the ends of the axle to the connected frame members.

The invention will be best understood by reference to the following description when taken in connection with the accompanying illustration of one specific embodiment thereof, while its scope will be more particularly pointed out in the appended claims.

In the drawings,—

Fig. 1 is a cross sectional elevation of the wheel, bearings and other parts associated with end of the axle and embodying one form of the invention;

Fig. 2 is a side elevation of the wheel and axle parts illustrated in Fig. 1; and Fig. 3 is a side elevation of a complete truck embodying the wheel, axle and side frame members illustrated in Fig. 1.

Referring to the drawings, I have there shown for illustrative purposes one form of the invention embodied in a cable car having the floor supporting member 5 mounted upon the bolster 7, the latter being resiliently supported at each opposite end in a truck having two opposite side frame members 9, one of which is shown in Fig. 3. The truck frame members are each supported at opposite ends by axle blocks 11 rigidly secured to the frame and each axle block is rigidly clamped to an axle 13 (Fig. 1). On each axle there is provided a pair of flanged wheels 15, each wheel being located near the end of the axle but between the opposite frame members, and adapted to turn freely on the rigidly held axle through the interposition of tapered roller bearings.

Each opposite end of the axle is reduced in diameter at 17 (see Fig. 1) and passes through the axle block 11, the projecting end 19 thereof being threaded and adapted to receive the lock washer 21 and clamping nut 23, whereby the axle may be rigidly clamped to the axle block and serve to bind the opposite frame members in fixed relation to each other.

Each wheel is provided with a chambered hub 25 within which there are provided two sets of tapered roller bearings. One set comprises the inner cone raceway 27 fixed on the axle between the shoulder 29 thereof and the spacing sleeve 31, with the intermediate tapered bearing rollers 33, the cage 35 and the outer raceway or cap 37, which latter is carried by the wheel hub. The remaining set of bearings comprises the inner cone raceway 39 which is fixed on the axle between the sleeve 31 and a second spacing sleeve 41, the intermediate tapered bearing rollers 43, the cage 44, and the outer raceway 45, the latter carried by the wheel hub. These two sets of bearings are so arranged with relation to each other that the opposite cone raceways 27 and 39 taper outwardly or away from each other, so that the axes of the bearing rollers of one set converge at a point on one side of the median plane of the wheel, while the axes of the bearing rollers of the remaining set converge at a point on the opposite side of said median plane.

With this arrangement means are provided for readily adjusting the bearings independently of the axle clamping nut 23 and without affecting the binding action of the axle in holding the opposite frame members in their rigid relation. For this purpose there is provided the cap 47 which encircles and closely fits the axle and has its periphery in threaded engagement with the interior of the hub. The inner shoulder of this cap bears against the outer shoulder of the raceway 37, so that by turning the cap the bearings may be adjusted from time to time to compensate for wear. To hold the cap in any assigned position of adjustment suitable means are provided, the same herein comprising a bolt 49 threaded into the outer shoulder of the hub and carrying a locking washer 51, the latter adapted to seat in any one of a plurality of depressions 53 (see Fig. 2) formed in the periphery of a projecting portion of the cap. To adjust the bearing the bolt 49 is unscrewed to free the cap, and after the cap has been turned the required amount the washer and bolt are replaced to engage with the adjacent depression 53 and thereby lock the cap in position. The cap also forms a retainer for lubricating oil, which may be introduced through the oil hole 55, maintaining a closed chamber for the lubricant up to and above the level of the lowermost tapered bearing rolls.

While I have herein shown and described for the purpose of illustration one specific embodiment of the invention and one application thereof, it is to be understood that the same is not limited to the mechanical details or relative arrangement of parts herein shown, but that extensive deviations may be made therefrom and that useful applications of the principles thereof other than that herein illustrated may be made, all without departing from the spirit of the invention.

Claims.

1. In a vehicle construction, a truck frame comprising opposite side frame members, a pair of axles connecting opposite side frame members, an axle block for each end of each axle by which the same is secured to the truck frame, each axle extending through its respective block, clamping means engaging the projecting ends of the axle for clamping the same fixedly to the axle block, thereby binding the truck frame members together through said axles, a wheel mounted to turn upon each end of each axle and located each inside the truck frame member and axle block, each wheel having a chambered hub, two sets of tapered roller bearings for each wheel and within the hub chamber thereof, each set comprising an inner cone raceway fixed on the axle, outer raceways on the wheel hub, with intermediate bearing rollers, the opposite cone raceways tapering outwardly or away from each other, a device for adjusting said bearings comprising a cap surrounding the axle and engaging one of the outer raceways on the side of the wheel opposite the frame member, said cap having threaded engagement with the wheel hub whereby both sets of bearings may be adjusted to take up the wear therein by adjustment of the cap independently of the axle clamping means, and means for holding said cap in adjusted position.

2. In a vehicle construction, the combination with frame members on opposite sides of the vehicle, of an axle connecting the opposite frame members and having its ends extending therethrough, clamping means for engaging the projecting ends of the axle and clamping the same rigidly to the adjacent frame member, wheels mounted to turn on the axle and located between opposite frame members, each wheel having a chambered hub, tapered roller bearings for each wheel, the same comprising inner cone raceways on the axle, outer raceways on the wheel hub and intermediate tapered bearing rollers, the opposite cone raceways tapering outwardly or away from each other, and an adjustable device for engaging one of the outer raceways thereby to adjust both sets of bearings to take up the wear therein independently of the axle clamping means, said adjustable device being on the side of the adjacent frame member opposite to that whereat said clamping means is located.

3. In a vehicle construction, the combination with a frame member, of an axle fixedly secured thereto, a wheel mounted to turn on said axle and located inside of said frame member, two sets of tapered roller bearings for said wheel comprising each an inner cone raceway on the axle, an outer raceway for the wheel with intermediate bearing rollers, said inner cone raceways tapering outwardly or away from each other, and means also located inside of said frame member for adjusting one of the outer raceways thereby to adjust both sets of bearings to take up the wear therein.

4. In a vehicle construction, the combination with a frame member, of an axle fixedly secured thereto, a wheel mounted to turn on said axle and located interiorly of said frame member, means for fixedly securing the end of said axle to said frame member, two sets of tapered roller bearings for said wheel comprising each an inner cone raceway on the axle, an outer raceway for the wheel with intermediate roller bearings, said inner cone raceways tapering outwardly or away from each other, a threaded member also located interiorly of said frame member for adjusting one of the outer raceways thereby to adjust both sets of bearings to take up the wear therein, and means for locking said threaded member in adjusted position comprising a clamping device adapted to engage with one of a series of peripheral depressions in the projecting portion of said threaded member.

5. In a vehicle construction, the combination with a truck frame having opposite side members each equipped with a pair of axle blocks, of a pair of axles, the opposite ends of which are rigidly clamped to said axle blocks, a pair of wheels mounted to turn on each axle and located between opposite frame members, each wheel having a chambered hub and tapered roller bearings, the latter comprising inner cone raceways on the axle, outer cone raceways on the wheel hub and intermediate tapered bearing rollers, the opposite cone raceways tapering outwardly or away from each other, and means located inside of said frame member for adjusting both sets of bearings to take up the wear therein independently of the axle clamping devices.

In testimony whereof, I have signed my name to this specification.

ALMON E. NORRIS.